Figure 1:
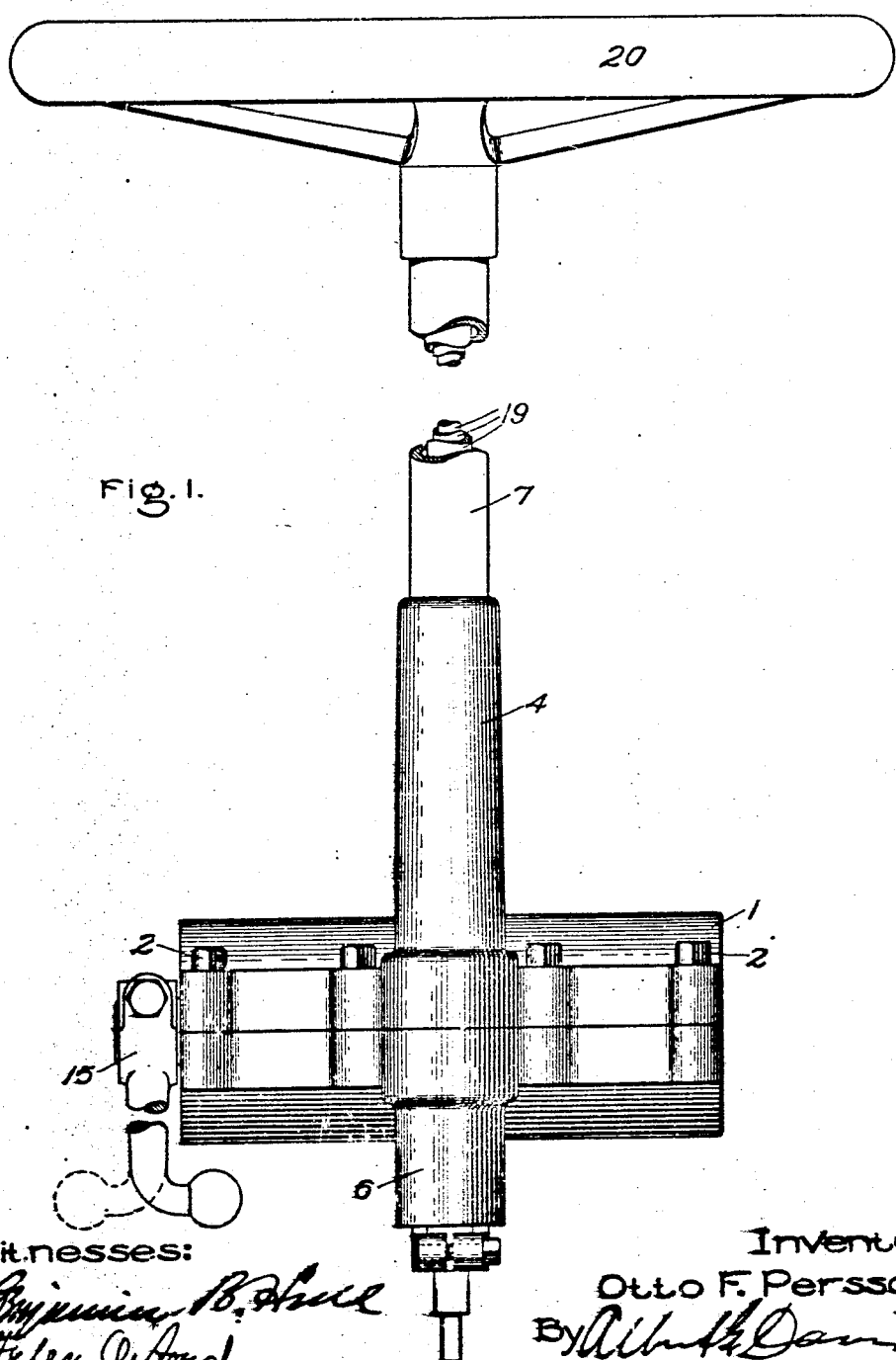

No. 876,994. PATENTED JAN. 21, 1908.
O. F. PERSSON.
MOTION CHECKING DEVICE.
APPLICATION FILED AUG. 24, 1905.

3 SHEETS—SHEET 1.

Witnesses:

Inventor,
Otto F. Persson,
By Albert H. Davis
Atty

No. 876,994. PATENTED JAN. 21, 1908.
O. F. PERSSON.
MOTION CHECKING DEVICE.
APPLICATION FILED AUG. 24, 1905.

3 SHEETS—SHEET 2.

Witnesses: Inventor,
Otto F. Persson
By Atty.

No. 876,994. PATENTED JAN. 21, 1908.
O. F. PERSSON.
MOTION CHECKING DEVICE.
APPLICATION FILED AUG. 24, 1905.
3 SHEETS—SHEET 3.
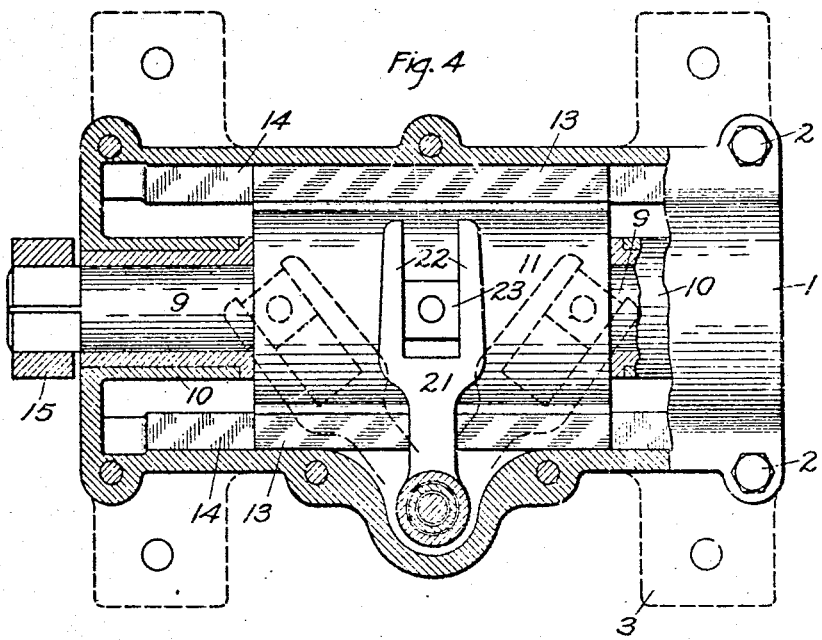
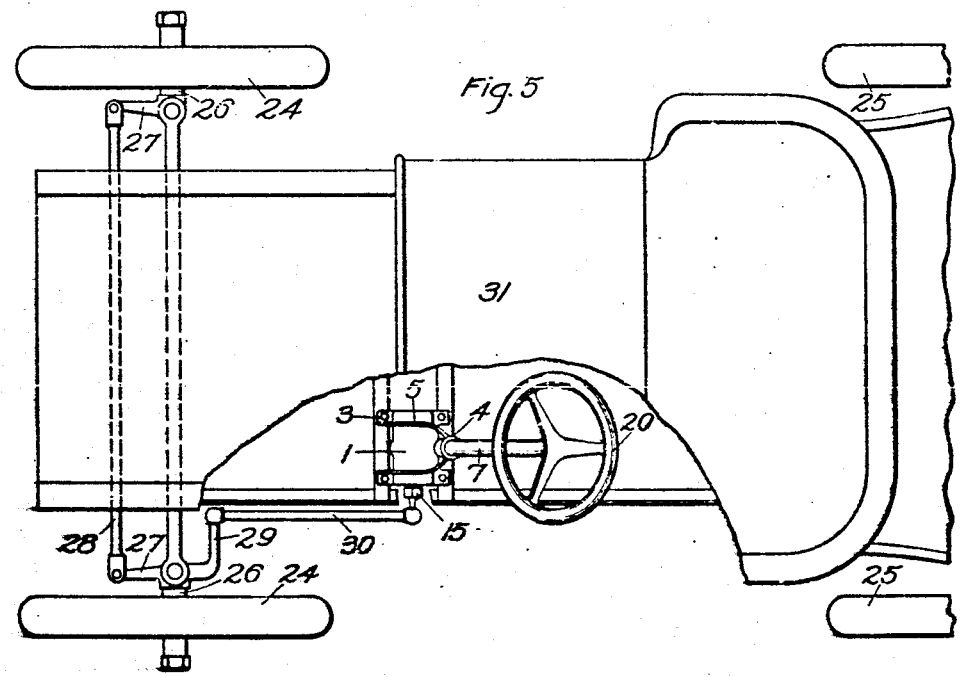
Witnesses:
Inventor:
Otto F. Persson
By ............
Atty.

UNITED STATES PATENT OFFICE.

OTTO F. PERSSON, OF LYNN, MASSACHUSETTS, ASSIGNOR TO GENERAL ELECTRIC COMPANY, A CORPORATION OF NEW YORK.

MOTION CHECKING DEVICE.

No. 876,994.      Specification of Letters Patent.      Patented Jan. 21, 1908.

Application filed August 24, 1905. Serial No. 275,597.

*To all whom it may concern:*

Be it known that I, OTTO F. PERSSON, a citizen of the United States, residing at Lynn, county of Essex, and State of Massachusetts, have invented certain new and useful Improvements in Motion Checking Devices, of which the following is a specification.

In certain steering checks with which I am familiar various types of gearing, such as bevel gears, a worm and segment, and a rack and pinion, are employed to transmit motion from the steering post or column to the steering wheels of the vehicle. With such gearing one tooth of one of the members engages at all times between two teeth or threads, as the case may be, of the other member, there being a line contact between the teeth. All of the shocks transmitted from the steering wheels are caused to act on the tooth of one member and either of the two engaging teeth of the other member, depending upon the direction in which the shock from the wheels acts. Since the bearing surfaces of the two engaging teeth make simply a line contact, and is therefore very limited in area, it follows that the shocks produce rapid wear of the teeth, so that a serious back-lash in the gearing sooner or later results. As the greater part of the travel is straight-ahead the central portions of the gearing suffer the most from shocks, and back-lash at this point develops rapidly so that steering is rendered difficult and dangerous, especially for high speeds. In some constructions attempts have been made to compensate for this wear by using an adjustable eccentric bushing, or other means, for one or both members of the gearing so that as the teeth wear the members can be readjusted.
This provides only a temporary cure for the evil and readjustment of the parts has to be resorted to time and again, and sooner or later renewal of parts is necessary. Experience demonstrates that none of these steering checks are entirely satisfactory, especially after having been in use for a short time. A construction requiring adjustment is objectionable, and moreover, the adjusting means renders the apparatus expensive to manufacture and maintain.

The object of my invention is to overcome the objections above referred to, and to provide a motion-checking device of improved construction that is simple and substantial in character and comprises few parts which are of minimum size and weight.

In carrying out my invention, I employ a non-rotatable member or actuator which is reciprocated or moved longitudinally by the steering post or column and a second member rotated by the first and transmitting motion therefrom to the steering wheels of the vehicle. These members are arranged one within the other, the outer one being rifled and the inner one provided with spiral projections or threads which make a working fit with the rifles or grooves of the outer member whereby rotary motion is imparted to one by simple rectilinear movement of the other. The pitch of the threads or grooves is coarse so as to obtain the desired range of rotary movement for a given longitudinal movement of the actuator without requiring too great a power for the steering operation, and this without permitting the rotary member to transmit wheel strains to the hand of the operator. The number of threads is preferably small so that they can be made with large and substantial dimensions, as for instance with an inner member of about two and three-quarters inches diameter, I employ four evenly displaced threads or spirals of about one-half inch depth. Hence with threads of say five inches in length, the total area of bearing surface to take the thrust in one direction is about ten square inches, which is extremely liberal considering the work the threads are intended to do. The outer member being rifled to fit the inner member, it also will have the same area of bearing surface.

In order to prevent the longitudinally movable member from rotating and also to assist in taking the shocks transmitted by the steering wheels, a frame or casing rigidly supported on some part of the vehicle is provided in which the two members of the check are mounted. Between the frame and the longitudinally movable member is provided one or more longitudinal splines or projections which fits or fit in a guideway or ways of the other part, their function being to guide the movements of the reciprocating member but more particularly to take the blows imparted to it. For this latter purpose the walls of the guideways and the surfaces of the splines engaging therewith are made amply large so that they can take the blows without any material wear. In a check having an inner member of the dimension above referred to, I employ two splines which are each about one-half inch in width and about five inches long, so that the total bearing surface of the splines or the guideways is ten square inches. In practice I have found this area to be satisfactory. If desired, however, more splines and guideways may be employed so as to increase the bearing surfaces. The figures which I have used to illustrate the area of the bearing surfaces between the threads and rifles of the two relatively rotatable members of the check, and between the spline and grooveways, are fairly representative of actual conditions. They can be changed, however, to suit any given requirement, but in every case provision for a maximum area of bearing surface is of paramount importance. The splines are arranged at diametrically opposite points. It will be noted that the splines on the reciprocating member are parallel to the axis of the rotating member or at right angles to its plane of rotation and hence have a maximum effect in preventing rotation of said reciprocating member.

Any suitable mechanism may be employed to actuate the reciprocating member, that mechanism being preferable which requires the least exertion on the part of the operator. According to one construction I employ a rack and pinion between the steering column and the said member. The steering column is supported at its lower end by the frame or casing of the check and keyed thereto is a pinion meshing with a rack provided on the said member. The meshing teeth of the pinion and the rack, while having only a line contact are not subject to road strains since they are absorbed by the splines and guideways. For this reason there is no reverse motion or shock transmitted to the hand or steering wheel on the column. This irreversibility of movement is more strictly true in speaking of the strains due to sudden shock from the road wheels. By reason of the coarseness of the rifles and threads of the relatively rotatable elements of the check, the sudden shocks tend to cause the elements to rotate together, but the splines prevent this, and the parts are held rigid. With more continued strains, however, such as produced by the wheels entering ruts in the roadway while they are held at an angle to the latter, the rotatable element will move and cause the reciprocating member or actuator to yield gradually and sufficiently to permit the wheels to aline with the ruts; otherwise, destructive strains might be brought to bear upon the wheels and other parts.

While I have described the invention as applied to a self-propelled vehicle it is to be understood that the invention is not so limited since it may be used for other purposes where it is desirable to prevent strains on one part from being transmitted to another. Instead of dividing the casing into two parts on a horizontal plane it may be made in a single piece with either one or two detachable heads.

Figure 2:
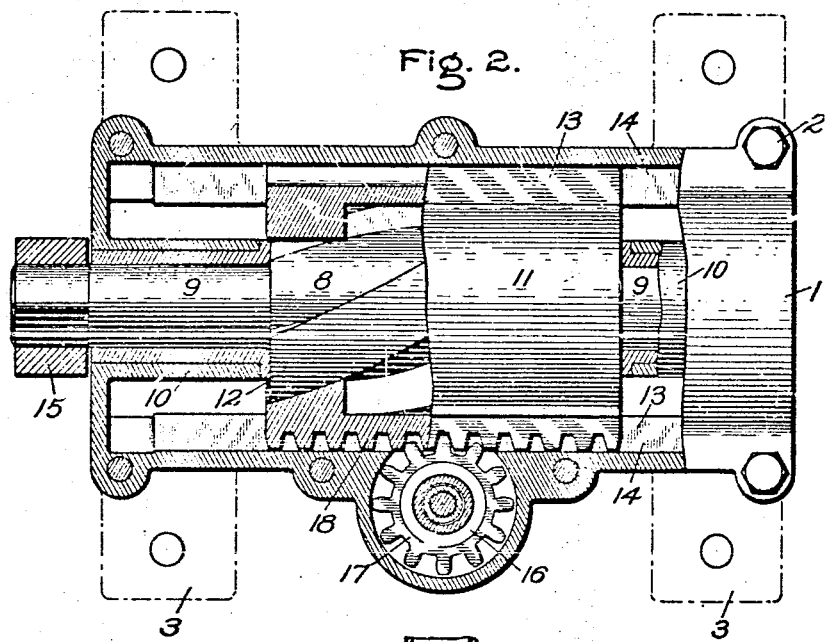
Figure 3:
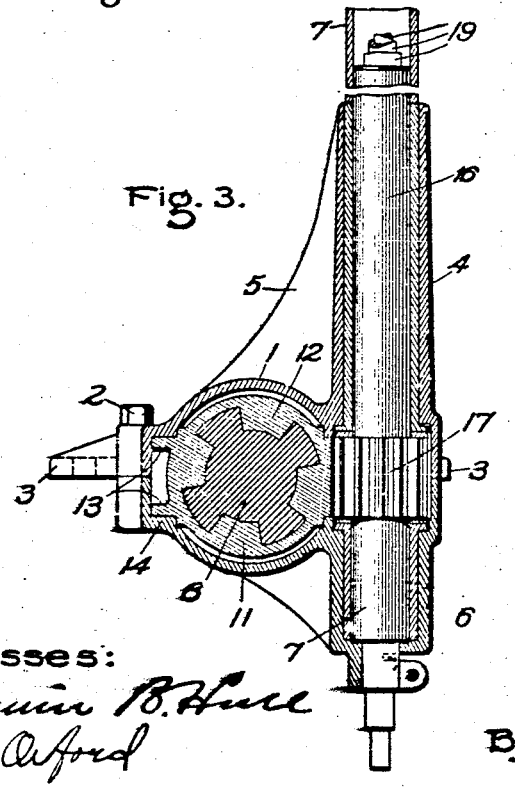

In the accompanying drawings which illustrate one embodiment of the invention, Figure 1 is a front elevation of the steering-check and column, the latter being partly broken away; Fig. 2 is a longitudinal section of the check showing parts in plan; Fig. 3 is a central transverse section of the check; Fig. 4 is a longitudinal section of the check showing modified features of construction adapting it for tiller or lever steering; and Fig. 5 is a plan of an automobile partly broken away with the check applied thereto.

Referring to the drawings, 1 represents a two-part casing or supporting frame for the movable members of the steering check, the parts being secured together by bolts 2. On the casing are arranged laterally projecting lugs 3, shown in Fig. 3 by means of which the check is mounted on the vehicle frame. On the upper half of the frame is formed a vertical tubular extension 4 reinforced by webs 5. The lower part is provided with a short tubular extension 6, the latter extension forming a step-bearing for the steering post or column 7, and the upper extension a guide-bearing therefor. The tubular extensions are arranged centrally between the ends of the frame at one side thereof and extend with their common axis at right angles to the axis of the casing or frame 1. Within the casing is mounted a rotatable member or screw 8, which is provided at its end with journals 9, seated in alined journal bearings 10. These journal bearings engage shoulders on the rotatable member and prevent it from being moved longitudinally due to any cause. Surrounding and engaging the screw is a non-rotatable reciprocating member or nut 11 which serves as an actuator to rotate the screw. The nut is rifled or grooved and the threads or projections 12 of the screw make a good working fit with the rifles or grooves of the nut. The rifles or grooves of the nut are of very coarse pitch so that by a reciprocating movement of the nut the screw is rotated. The nearer straight these rifles or grooves are, while still being capable of performing their intended function of turning the screw, the better will be the results secured as there will be less tendency for the screw to impart longitudinal movement to the nut, due to shocks received from the road wheels.

In order to prevent the nut from rotating, the same is provided with one or more longitudinally and radially extending projections or splines 13, which engage in grooves or guideways 14 in the frame or casing 1. The splines are adapted to transmit the shocks from the nut to the stationary and rigid frame or casing carried by the vehicle frame or other support. Instead of locating the splines in the position shown they may be located at other points. Where the casing is divided into two principal parts they may be displaced by 90°. When the casing is made in one piece with one or more detachable heads they may be situated wherever it is the most convenient. It will be observed that these splines and guideways are made with large substantial surfaces so that they can take the shocks transmitted from the wheels without producing appreciable wear. This is also true with respect to the threads and grooves of the screw and nut.

To reduce the length of the check to a minimum, the bearings 10 which are located in the plane of division of the parts of the casing, are tubular projections extending inwardly from the ends of the casing, and over these the nut is adapted to telescope as it moves to and from its central position. At one end of the screw, the journal is extended beyond the end of the casing and squared to receive an arm or crank 15 that transmits motion to the steering wheels. The two journals 9 are of the same length so that the screw can be turned end for end in order to locate the arm at one side of the frame or the other to adapt the check for location on either side of the vehicle body.

The check may be used for wheel or tiller steering as desired. In wheel steering, one revolution of the steering wheel more or less may be employed to move the road wheels from one extreme angular position to the other. Ordinarily one revolution will be the best as this gives the proper sensitiveness without the exercise of too great power by the operator. In order to obtain this relation between the hand wheel and the nut 11, a rack and pinion connection is employed having relatively wide faces. The steering post is preferably a tube having keyed in its lower end a stub shaft 16, Fig. 3, and on the shaft is secured a pinion 17 that meshes with a rack 18 formed on one of the projections or splines 13 of the nut. It will be observed that one of the splines not only prevents the nut from turning but also acts as a part of the mechanism for moving it longitudinally. This is an important feature of the construction since it tends toward simplicity and also reduces the amount of machine work. The number of teeth on the pinion and its diameter may be varied as desired to obtain any degree of sensitiveness. The stub shaft 16 is hollow so as to receive members 19 forming parts of the various regulating devices of the power apparatus such as the throttling and spark adjusting devices.

As shown in Fig. 2, the nut is in mid-position, this corresponding to straight-ahead travel of the vehicle. By revolving the hand-wheel 20 on the steering-column half a revolution to the right the nut is caused to assume an extreme right-hand position, and obviously the reverse movement occurs when the wheel is rotated half a revolution to the left. Any shocks that are transmitted from the road wheels to the screw are imparted to the walls of the rifles or grooves of the nut but the latter is prevented from rotation by means of the splines 13 that engage the walls of the guideways. Thus, the sudden shocks produced by common obstructions and unevennesses in the roadbed cause no reversal of movement through the steering check. The pitch of the rifles or grooves in the nut, however, are so designed that the nut 11 will slowly yield or move longitudinally under a continued strain from the road-wheel, such for instance as would be produced by the wheels dropping into ruts in the roadway while they are at a slight angle to the direction of the ruts. In this sense, the check is not absolutely irreversible. This provision for reversibility, however, is advantageous as it prolongs the life of the wheels and the axle construction. It will be seen that any sudden tendency of the road-wheels to rotate the nut will be resisted by the splines on the latter. The thrust tending to rotate the nut is in a direction parallel to the axis of the steering post or column. Under this condition there is absolutely no tendency for the nut to move longitudinally, and such being the case it follows that no strains will be imparted to the steering wheel, lever or tiller, in turn to be transmitted to the hand of the operator.

In tiller steering the angular movement of the tiller or hand lever is usually more limited than that of the wheel in wheel steering, say about 90 degrees more or less. In order to adapt a check for this method of steering the rack and pinion is dispensed with and the following construction employed. At the lower end of the steering post or column, Fig. 4, is secured a forked arm 21 which spans the nut from one side, one arm of the fork extending above and the other below the nut. Each portion of the arm is bifurcated to provide parallel jaws 22, which engage a block 23 pivoted on the nut. By this arrangement, the angular movement of the arm is readily translated into rectilinear movement of the nut. The extreme steering positions are shown by the dotted lines. In this construction, as well as that involving the pinion and rack, the sudden shocks from the road wheels are taken up by the splines of the nut and the walls of the grooves or guideways of the frame.

Referring to Fig. 5, 24 represents the steering wheels and 25 the driving wheels of the vehicle. The steering wheels are mounted on short stub axles 26 having forwardly extending arms 27 that are connected in the usual manner by a drag link 28. One of the steering knuckles is provided with a rearwardly extending arm 29 that connects with the crank 15 of the steering check by a link 30. Supported on the axles is the vehicle body 31 on which the steering check is mounted, the location of the latter being in the present instance on the left hand side.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In a motion checking device, the combination of a screw, a circular nut for imparting rotary motion to the screw, which is provided with projections on opposite sides of its axis, a circular frame provided with a plurality of grooves in which the projections are guided, a rack on the nut extending longitudinally thereof, a shaft supported by the frame with its axis perpendicular to the axis of the screw, and a pinion on the shaft engaging the rack to impart longitudinal motion to the nut to rotate the screw.

2. In a motion checking device, the combination of a supporting frame or structure, a coarse pitch screw mounted thereon, a nut engaging the screw to impart rotation thereto, and journal bearings for the screw carried by the frame and over which the nut is adapted to telescope as it moves to and fro.

3. As an article of manufacture, a motion checking device comprising a two-part frame, and journal bearings extending inwardly from the ends of the frame and located in the plane of division thereof, said frame having a guideway or groove formed therein which extends parallel to the axis of the journal bearings.

4. As an article of manufacture, a motion checking device comprising a two-part frame, journal bearings extending inwardly from the ends of the frame and located in the plane of division thereof, said frame also having a guideway or groove formed therein which extends parallel to the axis of the journal bearings, a tubular extension or socket on one part of the frame, and a step-bearing on the other part, said extension and bearing being adapted to receive the steering post or column.

5. In a motion checking device, the combination of a separable casing or frame, two relatively rotatable elements mounted therein, opposed spline and groove connections between one of the elements and the frame for guiding the said element longitudinally and taking strains therefrom, a rack provided on one of the splines, a pinion meshing with the rack, and a device for actuating the pinion to reciprocate the longitudinally movable element.

6. In a steering gear for motor vehicles, a casing or frame made in two parts and provided with internal opposed guides, a sliding nut made in the form of a sleeve with a coarse pitch thread, a rock-shaft having a thread meshing with that of the nut, bearings for the shaft, a steering arm attached to the shaft, a rack moving with the nut, a pinion meshing with the rack, and a manually-actuated device for moving the pinion.

7. In a steering gear for motor vehicles, the combination of movable elements, a shaft having a coarse pitch screw, an arm connected with the movable elements and the shaft, a casing for the shaft divided into two parts and provided with internal opposed guides in either part, a nut engaging the screw shaft to impart rotation thereto, and a post connected with the nut to reciprocate it and move the movable elements, said nut being provided with projections extending into said guides for preventing motion from being transmitted from the movable elements to the post.

8. In a motion-checking device, the combination of a hollow casing having longitudinal grooves in its inner surface, a nut provided with oppositely located splines on its periphery extending the length of the nut and having large bearing surfaces in engagement with said grooves, a shaft passing through the nut, bearings on the casing for the shaft, a screw-thread on the shaft in engagement with the nut, the pitch of the thread being such that by moving the nut longitudinally the shaft is rotated but a sudden force tending to rotate the shaft is unable to shift the nut, a rack and pinion for moving the nut lengthwise to rotate the screw-shaft, and a shaft at right angles to the axis of the nut and screw on which the pinion is mounted.

9. In a motion-checking device, the combination of a rotatable shaft having a coarse pitch screw-thread thereon, a longitudinally movable nut engaging the thread, the pitch of the thread being such that by moving the nut lengthwise the shaft is rotated while a sudden force tending to rotate the shaft is unable to shift the nut but a continued force will cause the nut to move slowly, a casing in which the parts are mounted, oppositely located splines extending the length of the nut and engaging grooves in the casing to form large bearing surfaces at right angles to the axis of the actuating shaft which prevent the rotation of the nut and receive shocks due to the forces tending to rotate the screw shaft, a longitudinal rack on the nut, an actuating shaft at right angles to the axis of the screw shaft, and a pinion on the actuating shaft which engages the rack to move the nut along the grooves to rotate the shaft.

In witness whereof, I have hereunto set my hand this twenty-second day of August, 1905.

OTTO F. PERSSON.

Witnesses:
DUGALD McK. McKILLOP,
SAMUEL TOWNSEND STEWART.